US011186747B2

(12) United States Patent
Humphreys

(10) Patent No.: US 11,186,747 B2
(45) Date of Patent: Nov. 30, 2021

(54) SYSTEM AND METHOD FOR REDUCING VISCOSITY VARIATIONS IN ROOFING ASPHALT

(71) Applicant: TAMKO Building Products LLC, Galena, KS (US)

(72) Inventor: David C. Humphreys, Joplin, MO (US)

(73) Assignee: TAMKO Building Products LLC, Galena, KS (US)

( * ) Notice: Subject to any disclaimer, the term of this patent is extended or adjusted under 35 U.S.C. 154(b) by 0 days.

(21) Appl. No.: 16/599,612

(22) Filed: Oct. 11, 2019

(65) Prior Publication Data
US 2020/0040220 A1 Feb. 6, 2020

Related U.S. Application Data

(63) Continuation of application No. 14/864,625, filed on Sep. 24, 2015, now abandoned.

(60) Provisional application No. 62/055,465, filed on Sep. 25, 2014.

(51) Int. Cl.
C09D 195/00 (2006.01)
C08L 95/00 (2006.01)
B01F 15/00 (2006.01)
B01F 3/10 (2006.01)
B01F 5/10 (2006.01)
B01F 3/08 (2006.01)
B01F 15/04 (2006.01)

(52) U.S. Cl.
CPC ............ C09D 195/00 (2013.01); B01F 3/088 (2013.01); B01F 3/10 (2013.01); B01F 5/106 (2013.01); B01F 15/00246 (2013.01); B01F 15/0408 (2013.01); C08L 95/00 (2013.01); C08L 2555/10 (2013.01)

(58) Field of Classification Search
CPC ....... C09D 195/00; C08L 95/00; H01L 21/00; B01F 15/04
See application file for complete search history.

(56) References Cited

U.S. PATENT DOCUMENTS

| 1,466,639 | A |   | 8/1923 | Browne |
|---|---|---|---|---|
| 2,649,384 | A |   | 8/1953 | Anderson |
| 2,848,429 | A |   | 8/1958 | Woodruff et al. |
| 3,632,700 | A |   | 1/1972 | Oglevee et al. |
| 4,397,561 | A | * | 8/1983 | Strong ............. B01F 15/00155 366/132 |
| 4,456,523 | A |   | 6/1984 | Carlos et al. |

(Continued)

Primary Examiner — Dah-Wei D. Yuan
Assistant Examiner — Andrew J Bowman
(74) Attorney, Agent, or Firm — Husch Blackwell LLP

(57) ABSTRACT

An asphalt shingle coating system that includes a coater, a mixer, a viscosity gauge, a wax supply, a wax pump and a control system. The coater applies a layer of a coating asphalt mixture on an asphalt shingle substrate. The mixer mixes the coating asphalt mixture and is positioned upstream of the coater. The viscosity gauge may be positioned between the coater and the mixer, and it measures the viscosity of said coating asphalt mixture before it is delivered to the coater. The wax supply is in fluid communication with the mixer and a wax pump may deliver a volume of wax from the wax supply to the mixer, and the control system may selectively adjust the operation of the wax pump to substantially maintain a desired viscosity of said coating asphalt mixture.

10 Claims, 3 Drawing Sheets

(56) References Cited

U.S. PATENT DOCUMENTS

| | | | |
|---|---|---|---|
| 4,497,921 | A | 2/1985 | Chang et al. |
| 4,780,146 | A | 10/1988 | Chang |
| 5,465,810 | A | 11/1995 | Peterson et al. |
| 6,120,913 | A | 9/2000 | Kluttz et al. |
| 6,130,276 | A | 10/2000 | Vermilion et al. |
| 7,569,627 | B2 | 8/2009 | Dean |
| 7,857,904 | B2 | 12/2010 | Trumbore et al. |
| 7,951,239 | B2 | 5/2011 | Trumbore et al. |
| 7,951,240 | B2 | 5/2011 | Trumbore et al. |
| 8,003,717 | B2 | 8/2011 | Bobee et al. |
| 8,034,172 | B2 | 10/2011 | Naidoo et al. |
| 8,114,927 | B1 | 2/2012 | Ahluwalia |
| 8,206,499 | B2 | 6/2012 | Wortelboer |
| 8,404,037 | B2 | 3/2013 | Naidoo et al. |
| 8,440,011 | B2 * | 5/2013 | Naidoo .................. E01C 7/265 106/273.1 |
| 8,496,196 | B2 | 7/2013 | Zickell et al. |
| 8,679,245 | B2 | 3/2014 | Reinke et al. |
| 8,696,806 | B2 | 4/2014 | Williams et al. |
| 8,735,616 | B2 | 5/2014 | Hassan et al. |
| 8,753,442 | B2 | 6/2014 | Trumbore et al. |
| 2004/0110394 | A1 | 6/2004 | Barth et al. |
| 2010/0048771 | A1 | 2/2010 | Osborn |
| 2010/0236178 | A1 | 9/2010 | Loftus et al. |
| 2011/0197785 | A1 | 8/2011 | Trumbore et al. |
| 2011/0233105 | A1 | 9/2011 | Bailey |
| 2011/0294927 | A1 | 12/2011 | Williams et al. |
| 2012/0225979 | A1 | 9/2012 | Naidoo et al. |
| 2013/0029101 | A1 | 1/2013 | Trewalla et al. |
| 2013/0123396 | A1 | 3/2013 | Pochert |
| 2013/0123395 | A1 | 5/2013 | Kim et al. |
| 2014/0033951 | A1 | 2/2014 | Ech et al. |
| 2014/0069297 | A1 | 3/2014 | Rotz et al. |
| 2014/0076777 | A1 | 3/2014 | Kriz et al. |

* cited by examiner

SYSTEM AND METHOD FOR REDUCING VISCOSITY VARIATIONS IN ROOFING ASPHALT

CROSS-REFERENCE TO RELATED APPLICATION

This application is a continuation of U.S. Non-Provisional patent application Ser. No. 14/864,625 filed Sep. 24, 2015, which claims the benefit of U.S. Provisional Patent Application No. 62/055,465 filed Sep. 25, 2014, the entire disclosure of which is hereby incorporated by reference.

FIELD OF THE INVENTION

This present invention relates to a system and method of reducing the variations in the viscosity of a coating asphalt mixture during the manufacturing of roofing shingles.

BACKGROUND OF THE INVENTION

The costs of asphaltic material and other petroleum based products have steadily risen over time. Optimizing the use of coating asphalt is a continual goal in the art. An inefficiency that has remained relatively unaddressed in the manufacture of asphalt roofing shingles is the inherent variations in the viscosity of the coating asphalt mixture and its effect on material inefficiencies and/or product quality.

Base asphalt used in roofing mixtures often includes a number of material variations due to nature or the refining process. Thus, even slight variations in the viscosity of the coating asphalt mixture can result in applying a thicker or thinner layer of asphalt coating to the shingle substrate. If the applied coating layer is too thick, then material inefficiencies are experienced. If the applied coating layer is too thin, then product performance issues may arise. In any event, variations in asphalt coating mixture viscosity results in losses due to material application inefficiencies and/or variations and uncertainty in product performance.

Thus there is a need in the art to supply a coater used in the manufacture of asphalt shingles with a coating asphalt mixture which provides the asphalt coating at a consistent viscosity to provide and apply a coating layer of consistent thickness on the substrate in order to optimize material efficiency and provide consistent product performance.

SUMMARY OF INVENTION

The present invention is directed toward an asphalt shingle coating system comprising a coater, a mixer, a wax supply and a wax pump, a viscosity gauge, and a control system. The coater coats an asphalt shingle substrate with a coating asphalt mixture. The mixer mixes the coating asphalt mixture and is in fluid communication and upstream of the coater. The wax supply provides a wax that can be used to control (usually decrease) the viscosity of the coating asphalt mix, and the wax pump is used to supply the system a volume of wax from the wax supply to the mixer when or if it is needed. The viscosity gauge measures the viscosity of the coating asphalt mixture delivered to the coater and is disposed between the coater and the mixer. The control system is in electronic communication with the viscosity gauge and the wax pump, and is operable to selectively adjust the operation of the wax pump to substantially maintain a desired viscosity of the coating asphalt mixture.

In one embodiment, the present asphalt shingle coating system may further comprise a supply return valve and a supply return line for directing and conveying the asphalt coating back to the mixer if the asphalt coating is out of specification. Another embodiment may further include the mixer having two or more level sensors used to determine the amount of wax to be added to result in a coating asphalt mixture exhibiting the desired component proportions and material properties.

Another embodiment further includes a supply conduit that places the coater in fluid communication with the mixer, and a static mixer tube disposed in the supply conduit. In this embodiment, the viscosity gauge is disposed downstream of the static mixer, and the wax supply is in fluid communication with the supply conduit rather than or in addition to the mixer. The wax supply has an inlet into the supply conduit that is located upstream of the static mixer.

The present asphalt shingle coating system may be used according to the following method for substantially maintaining the viscosity of a coating asphalt mixture delivered to a coater during the manufacture of a roofing shingle. The present method includes the steps of measuring the viscosity of the coating asphalt mixture prior to the asphalt mixture being delivered to the coater, comparing the measured viscosity to a desired viscosity, and adjusting the amount of wax in the coating asphalt mixture if the measured viscosity varies from the desired viscosity.

In addition, the method for coating shingles herein may also include one or more of the steps of adding wax to the coating asphalt mixture if the measured viscosity is higher than the desired viscosity range, reducing the amount of wax added to the coating asphalt mixture if the measured viscosity is lower than the desired viscosity range, and mixing the coating asphalt mixture until the mixture is at least substantially homogeneous.

Other aspects and advantages of the present invention will be apparent from the following detailed description of the preferred embodiments and the accompanying drawing figures.

BRIEF DESCRIPTION OF THE SEVERAL VIEWS OF THE DRAWINGS

The accompanying drawings form a part of the specification and are to be read in conjunction therewith, in which like reference numerals are employed to indicate like or similar parts in the various views.

Figure 1:
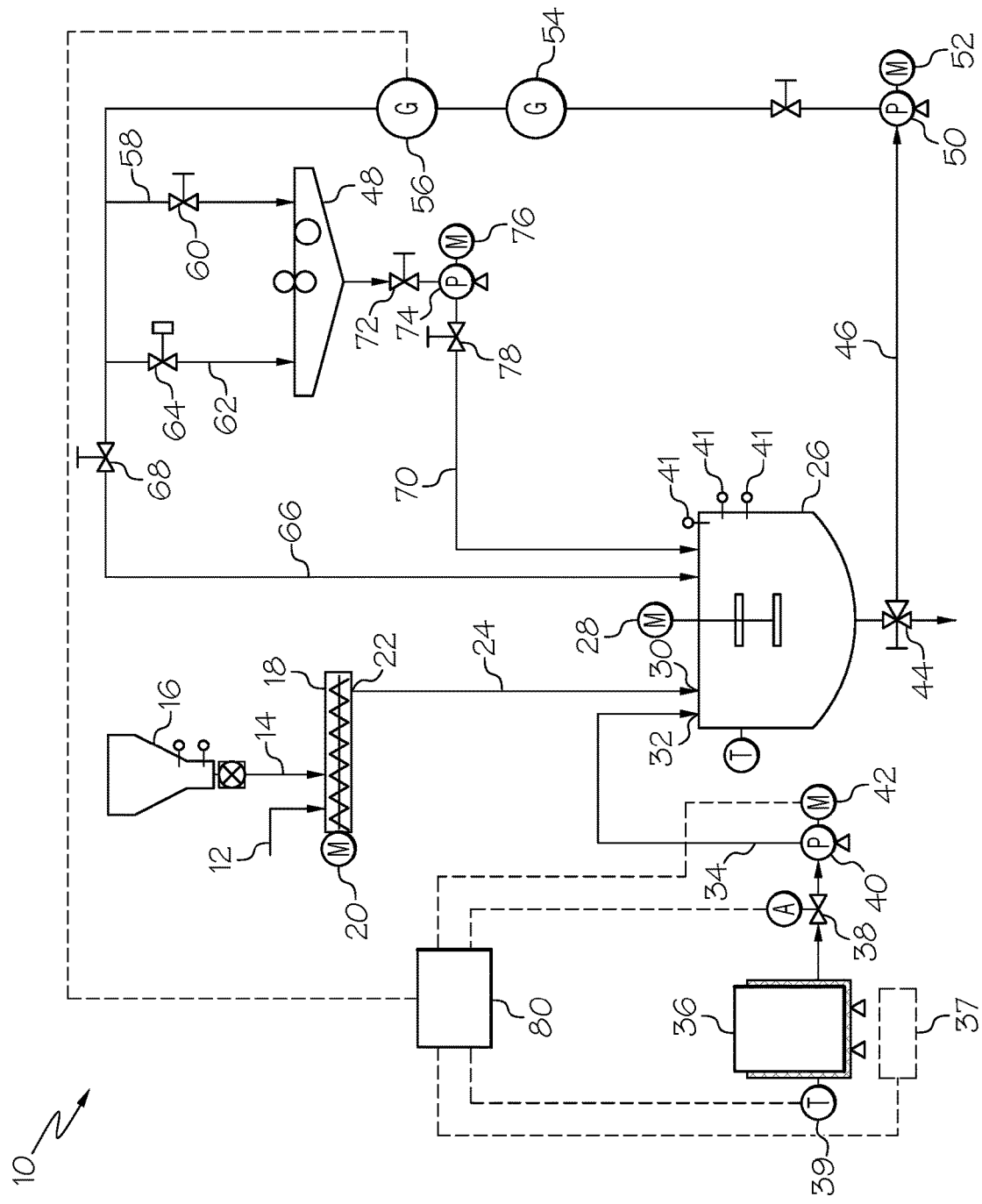
FIG. 1 is a schematic view of one embodiment of an asphalt coating system in accordance with the teachings of the present disclosure.

While the disclosure is susceptible to various modifications and alternative forms, a specific embodiment thereof is shown by way of example in the drawing and will herein be described in detail. It should be understood, however, that the drawings and detailed description presented herein are not intended to limit the disclosure to the particular embodiment disclosed, but to the contrary, the intention is to cover all modifications, equivalents, and alternatives falling within the spirit and scope of the present disclosure as defined by the appended claims.

DETAILED DESCRIPTION OF THE INVENTION

The following detailed description of the present invention references the accompanying drawing figures that illustrate specific embodiments in which the invention can be practiced. The embodiments are intended to describe aspects of the present invention in sufficient detail to enable those skilled in the art to practice the invention. Other embodiments can be utilized and changes can be made without departing from the spirit and scope of the present invention. The present invention is defined by the appended claims and, therefore, the description is not to be taken in a limiting sense and shall not limit the scope of equivalents to which such claims are entitled.

The present invention relates to a system and method for adding varying amounts of wax to a roofing asphalt mixture based upon the measured viscosity of the coating asphalt mixture proximate the point of application to a roofing substrate. The present invention allows for the regulation of the viscosity of the asphalt through the insertion of a known quantity of wax material into the asphalt mixture, wherein the amount can vary to maintain a consistent viscosity. FIG. 1 illustrates a schematic of an embodiment of an asphalt shingle coating system 10 including an asphalt supply line-in 12 for feeding a base roofing asphalt mixture, and an aggregate/filler inlet 14 which provides aggregate or filler from an aggregate/filler supply hopper 16 into a horizontal mixer 18. The horizontal mixer 18 includes a mixer motor 20 that drives the mixing components to mix the asphalt mixture and the filler into a filled coating asphalt mixture to apply on the shingle substrate.

The filled coating exits the horizontal mixer 18 at a horizontal mixer output 22 into a filled coating supply line 24, wherein the filled coating is fed into a vertical mixer 26 driven by a vertical motor 28. The filled coating enters vertical mixer 26 from supply line 24 through a filled coating inlet 30. Wax may be selectively mixed into the coating asphalt mixture and may enter vertical mixer 26 through a wax inlet 32 after traveling through a wax supply line 34 from a wax supply tank 36. Wax supply tank 36 may be a heated storage tank to maintain the wax in a liquid state. Wax supply tank 36 may be an electric trace tank with insulation or the wax may be a low temperature heated fluid. Wax supply tank 36 may be supported on one or more load cells 37, which monitor the weight of the volume of wax contained in wax supply tank 36 and can be used to monitor the volume of wax that is dispersed from wax supply tank 36 at any given time. Load cell 37 may also be used to monitor the wax supply so as to indicate when the supply needs to be replenished. Other embodiments may measure the volume of wax being added into the mixture using flow meters or a pump estimation technique which estimates the volume of wax delivered using the known volume that the pump delivers per unit of time. The flow of wax into vertical mixer 26 and the mixture rate may be selectively and variably controlled using a wax valve 38, and/or a wax supply pump 40 driven by a wax supply pump motor 42. Wax valve 38 may be an "on or off" valve, a variable flow valve, or a check valve. Pump 40 may be any type of pump known in the art, including a centrifugal or positive displacement valve. Wax supply tank 36 may also include a temperature gauge 39 to measure the temperature of the wax additive.

Any type of wax that is now known or may be used in the future, which can be added to an asphalt composition is within the scope of the present invention. As will be recognized by a person of skill in the art, some waxes may be more preferable than others for particular circumstances. Waxes now known in the industry include: tailing wax, paraffin wax, microcyrstalline wax (both high and low melting point), ethylene bis-stearamide wax (EBS), Fischer-Tropsch wax (FT), oxidized Fischer-Tropsch wax (FTO), polyolefin waxes, polyethylene wax (PE), oxidized polyethylene wax (PEO), polypropylene wax, polypropylene/polyethylene wax, alcohol wax, silicone wax, chlorinated wax or paraffin, amide waxes, ester waxes, carboxylic acid waxes, candelilla wax, carnauba wax, rice wax, Japan wax, jojoba oil, beeswax, lanolin, and whale wax, montan wax, ozokerite, and ceresin. In addition, other viscosity modifiers may be used in place of wax, including tall oil pitch, soybean by-products, naphthenic oils, or recycled oils.

Vertical mixer 26 is of a type that is generally known in the art and may be jacketed with hot oil heating fluid or other heating method to maintain an operational temperature of the coating asphalt in the mixer between three-hundred-fifty (350) degrees and four-hundred-fifty (450) degrees. Vertical mixer 26 may include one or more contents level probes 41. The content level probes 41 may be used to manage batch insertion and delivery processes within the vertical mixer to manage a real-time concentration problem between the low and high level probe set points in order to achieve and maintain a homogenous mixture of limestone, coating asphalt, and a desired quantity of wax material based on the required or desired physical properties of the delivered coating asphalt mixture.

The final formulation of the coating asphalt mixture then exits vertical mixer 26 through a vertical mixer outlet valve 44 and travels through a coater supply line 46 to a coater 48. A coater asphalt pump 50 driven by a motor 52 pumps the coating asphalt to coater 48. The flow of the coating asphalt may be monitored by any number of instruments and/or monitors including at least a density gauge 54, and a viscosity gauge 56. Other gauges are within the scope of the present invention, including a temperature gauge, flow velocity gauge, or any other gauge or monitor for measuring a physical or operational property of the flowing coating asphalt. Supply return valve 68 and all valves utilized in the present coating system may be an "on or off" valve, a variable flow valve, or a check valve. Any of the holding tanks, mixers or supply lines of the present invention may include one or more monitors or gauges for temperature, weight, density, pressure, or to measure any other desired operational or processing property.

Viscosity as used herein is defined as the resistance of fluid to both shear and flow. As such, the present invention may utilize both kinematic viscosity and/or dynamic viscosity measurements. The viscosity gauge 56 may provide a proportional control signal to a controller in the form of a prescribed voltage or a 4-20 milliamp signal to indicate the viscosity measurement of the coating asphalt flowing through the coater supply line 46.

In delivering the coating asphalt mixture to the coater, a back coating line 58 may branch off of coater supply line 46 to deliver coating asphalt for coating the back side of a shingle substrate. The flow of the coating asphalt to the coater for back coating may be controlled using a back coating line valve 60. Similarly, a front coating line 62 may branch off of coater supply line 46 to deliver coating asphalt for coating the front side of a shingle substrate. The flow of the coating asphalt to the coater through the front coating line 62 may be controlled using a back coating line valve 64.

Coater supply line 46 may become a coater supply return line 66 around a supply return valve 68 which allows the coating asphalt to cycle back to the vertical mixer 26. Supply return valve 68 may be selectively operated to direct all or part of the asphalt coating flow to coaters 48. Alternatively, valve 68, valves 60 and 64 may be coordinated so all the coating asphalt in coating supply line 46 returns to vertical mixer 26, for example, if the asphalt coating is out of specification. In addition, any coating asphalt that does not adhere to the shingle substrate at coater 48 may be collected and fed back to vertical mixer 26 through a coating return line 70. The flow of un-adhered coating asphalt collected at coater 48 may be controlled using at least one of a first coating return valve 72, a coating return pump 74, a coating return pump motor 76, and a coating return second valve 78.

The operation of all or a part of the present asphalt shingle coating system 10 may be controlled using a controller 80. Controller 80 may be in electronic communication with any of the pumps, valves, motors, and measurement devices of the present asphalt shingle coating system 10. Particularly in the embodiment shown in FIG. 1, controller 80 is in electronic communication with at least wax supply tank 36, load cell 37, wax valve 38, wax supply pump motor 42, and the viscosity gauge 56.

Controller 80 may include one of or all of the following control and optimization methods: proportional control, integral control, and derivative control. Proportional control is the control step that calculates the difference between the target viscosity and the actual viscosity measured by viscosity gauge 56 in coater supply line 46. A proportional value is applied against the resulting error factor, which results in a quantity of wax that should be added to or withheld from the overall mixture to adjust the viscosity. Controller 80 then controls, operates and/or monitors one of pump motor 42, wax valve 38, and load cell 37 or other volume measurement method to deliver the required quantity of wax to result in the desired viscosity.

Integral control involves evaluating the effect of successive portion control sequences as sequential batches are completed. If over time the proportional adjustments are not achieving the target viscosity, then the integral control function will increase the calculated volume of wax during a proportional calculation to drive toward the target in increasingly aggressive steps. If an over-compensation condition occurs, the integral control function may result in a reduction of the amount of wax introduced into the mixture.

Derivative control involves using successive proportional control and integral control iterations to evaluate the rate of change between batches and, thus, make an initial shock adjustment to the overall control algorithm. This may allow a reduction in the amount of time it takes for the proportional control and integral control iterations to reach target values of viscosity. This may become a slope calculation and a resultant prediction over time from the current measured value of viscosity. The integral and derivative control methods provide for increased overall efficiency and optimization of the control system.

Figure 3:
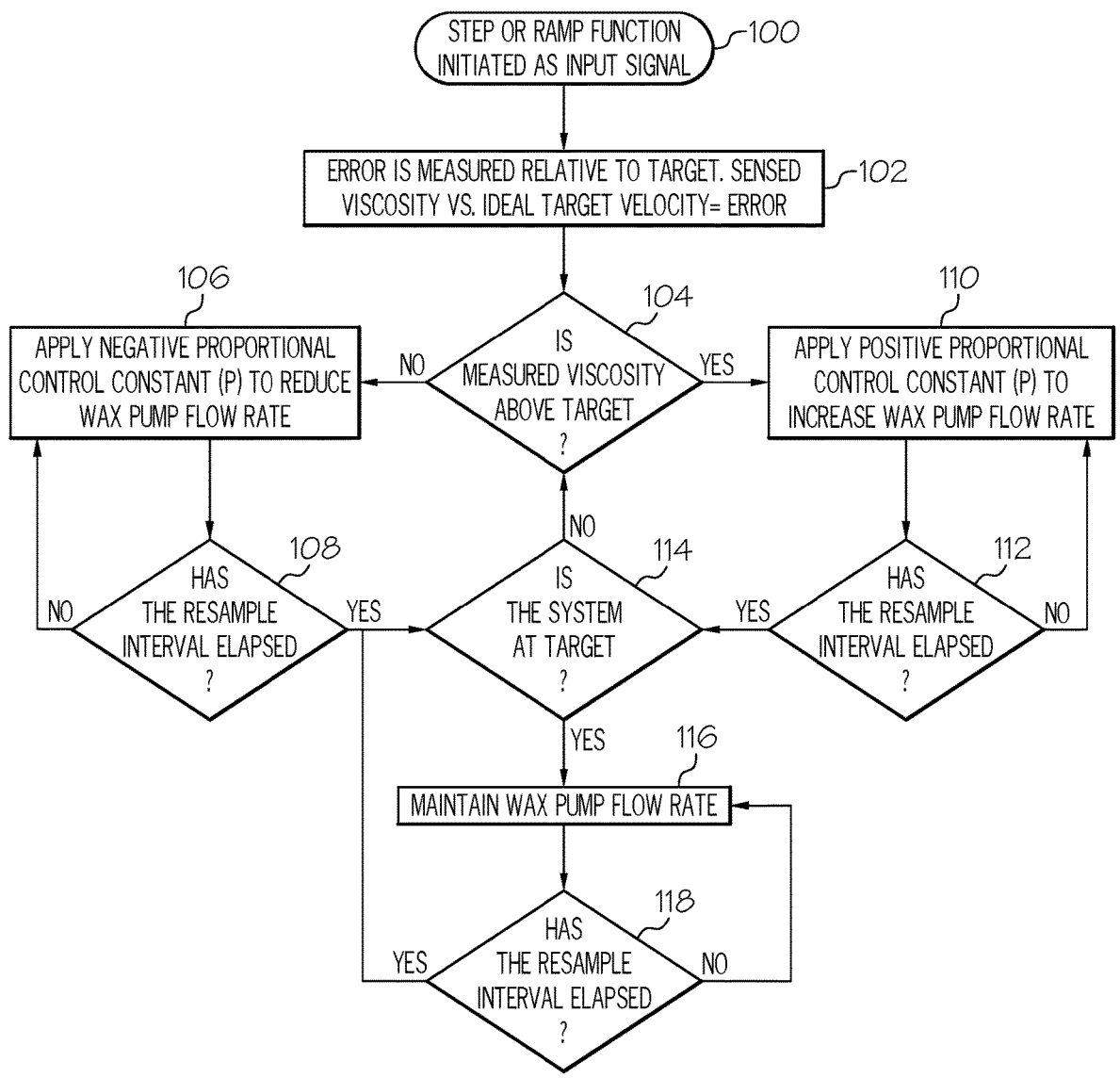
FIG. 3 is a schematic view of the flow chart for a control algorithm that may be used in one embodiment of an asphalt coating system in accordance with the teachings of the present disclosure.

In one embodiment, controller 80 may be a standard PID control system such as that described in SIEMENS Standard PID Control Manual, Edition March 2003, found at http://cache.automation.siemens.com/dnl/DQ/DQ1MzA5AAAA_1137084_HB/Stdpid_e.pdf. In addition, controller may utilize a control algorithm in optimizing the viscosity of the coating asphalt. One embodiment of such a control algorithm which may be used in the present invention is shown in FIG. 3.

Figure 2:
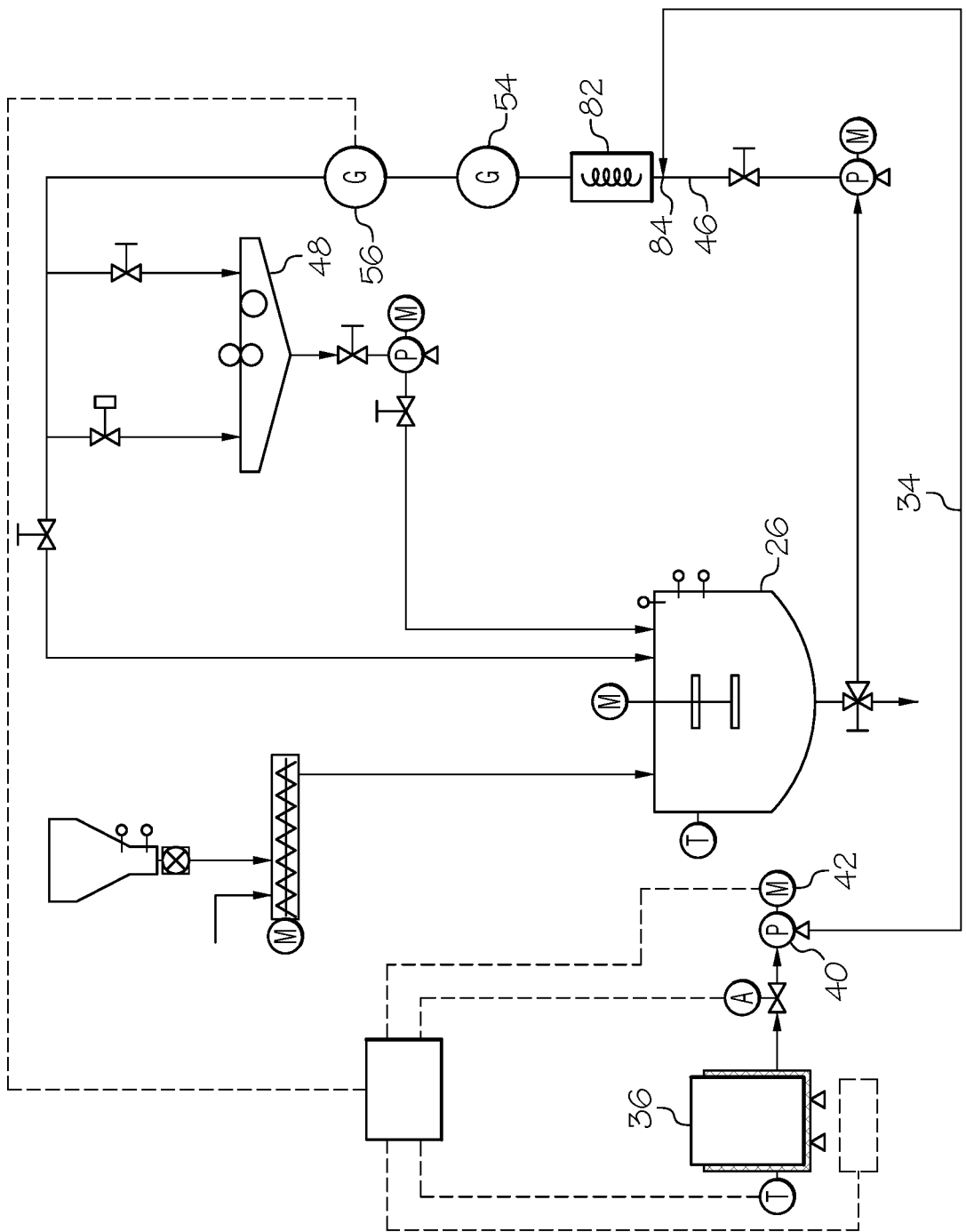
FIG. 2 is a schematic view of another embodiment of an asphalt coating system in accordance with the teachings of the present disclosure.

FIG. 2 illustrates an alternative embodiment wherein the wax is introduced in coater supply line 46 upstream of a static mixer tube 82 disposed in the supply line 46 at an inlet 84. The static mixer tube 82 is preferably upstream of viscosity gauge 56. If the inlet of the wax supply 84, the static mixer tube 82 and viscosity gauge 56 are in close proximity, then this configuration may provide a faster response time and reduce the duration of time that the viscosity may be out of a desired range, but a person of skill in the art would appreciate that care must be taken to ensure homogeneity of the coating asphalt mixture when using the static mixer tube 82.

The present asphalt shingle coating system 10 is used to provide coater 48 with a supply of coating asphalt which has a relatively constant viscosity. This provides numerous benefits including increasing product uniformity, ensuring a consistent product quality, increasing material-use efficiency, and benefitting the proper operation of the coating machinery. In particular, the present asphalt shingle coating system 10 includes a variable and controlled introduction of wax into the coating asphalt mixture in response to the measured or actual viscosity of the coating asphalt in the coater supply line 46 measured by viscosity gauge 56.

Raw asphalt and the granular filler are introduced into horizontal mixer 18 where they are mixed together. The filled coating is then piped through filled coating supply line 24 to a vertical mixer 26. The operation of the vertical mixer 26 may allow for the homogenous mixing of the coating asphalt, which includes the base asphalt, aggregate filler (limestone), and other additives desired in the coating mixture. In one embodiment, wax may be selectively delivered into vertical mixer 26 to affect the viscosity of the coating asphalt mixture to the coater 48. Vertical mixer 26 may also be used to mix the wax homogenously with the other ingredients of the coating asphalt.

The coating asphalt mixture flows out of the vertical mixer 26 through the coater supply line 46 to coater 48. Coater asphalt pump 50 and motor 52 ensure that the coating asphalt mixture is delivered to the coater 48 in the desired quantity and rate. One or more gauges or sensors may be disposed in coater supply line 46 to measure various physical properties of the coating asphalt mixture for quality control or operational purposes. In particular, viscosity gauge 56 may measure the kinematic viscosity and/or dynamic viscosity of the coating asphalt mixture. Viscosity gauge 56 is in electronic communication with controller 80 wherein controller 80 receives a signal from viscosity gauge 56 corresponding to the desired viscosity measurements.

Controller 80 compares the measured or actual viscosity to a desired or target viscosity to determine whether the viscosity of the coating asphalt mixture is within the desired range. If the viscosity is higher than the desired range, controller 80 estimates the amount of wax that needs to be added to the filled coating mixture and signals to wax supply motor 42 of wax pump 40 to increase the flow of wax and/or adjust wax valve 38 to add the desired volume of additional wax into the formulation. The additional wax may be added directly to the vertical mixer 26 or may be added into the coater supply line 46 and incorporated into the mixture using a static mixing tube 82. Controller 80 may record and analyze the cycles of individual adding of wax to optimize and learn how much wax needs to be added at various occurrences of the viscosity of the coating asphalt mixture being higher than the desired range.

In the event the viscosity measured by viscosity gauge 56 is lower than the desired range, then controller 80 may similarly act to reduce the volume of wax being added to the filled coating mixture in either vertical mixer 26 or the coater supply line 46. Thus, controller 80 actively monitors the viscosity of the coating asphalt mixture and reacts in substantially real-time to increase or decrease the amount of wax added to the coating asphalt mixture based upon the measured viscosity.

The present asphalt shingle coating system 10 may be used when the base coating asphalt mixture formulation to be used does not include wax and then exclusively adds wax as determined to decrease the viscosity. Alternatively, if the base coating asphalt mixture formulation already includes wax, the present system may be used to vary the proportionate quantity of wax in the mixture to create and maintain the desired viscosity. There are many factors which will be considered by a person of skill in the art with respect to the base formulations such as the initial quality of the base asphalt, the volume of filler, whether the base asphalt is blown, or whether additional admixtures are added to the asphalt mixture. Thus, once a base coating asphalt mixture is specified, the present asphalt shingle coating system 10 may be adapted as necessary and used to maintain the desired application viscosity using the addition of wax as described herein.

As shown in FIG. 3, one embodiment of a control algorithm which may be carried out by control system/controller 80 includes step 100 of inputting a step or ramp function as an input signal in controller 80. In step 102, controller 80 seeks to determine whether there is an error between the viscosity measured at the sensor and a target viscosity. Step 104 involves controller 80 determining if the measured viscosity is above the target viscosity. If the measured viscosity is below the target viscosity, controller 80 initiates step 106, which includes applying a negative proportional control constant "P" to reduce the wax pump's flow rate. In step 108, controller 80 then determines if the resample time interval has elapsed. If not, then controller 80 continues performing step 106. If the resample time interval has elapsed, then controller 80 moves to step 114 to again measure and/or determine if the viscosity is at target.

If in step 104, it is determined that the measured viscosity is above the target viscosity, then controller 80 initiates step 110, which comprises applying a positive proportional control constant "P" to increase the wax pump's flow rate to decrease the viscosity. In step 112, controller 80 then determines if the resample time interval has elapsed. If not, then controller 80 continues performing step 110. If the resample time interval has elapsed, then controller 80 moves to step 114 to determine if the viscosity is at target.

If controller 80 determines in step 114 that the system is not at target, then controller again performs step 104 and adjusts the operation of the wax pump based on whether the measured viscosity is above or below the target. If, in step 114, controller 80 determines the system is at the target viscosity, then controller 80 moves to step 116 and maintains the wax pump flow rate. In step 118, controller 80 then determines whether the resample interval has elapsed. If not, it keeps performing step 116 of maintaining the wax pump flow rate. If the resample interval has elapsed, controller 80 again performs step 114 to determine whether the system is operating to deliver a coating asphalt that is at target viscosity.

The resample interval may be set to best optimize performance. In one embodiment, the interval is less than a second (in the milliseconds), and in another embodiment, the interval may be multiple minutes. This variable may be left to the discretion of the operator; however, it will be appreciated that the closer the interval, the less likelihood of the coating asphalt will be delivered to the coater outside of the target viscosity.

As is evident from the foregoing description, certain aspects of the present invention are not limited to the particular details of the examples illustrated herein. It is therefore contemplated that other modifications and applications using other similar or related features or techniques will occur to those skilled in the art. It is accordingly intended that all such modifications, variations, and other uses and applications which do not depart from the spirit and scope of the present invention are deemed to be covered by the present invention.

Other aspects, objects, and advantages of the present invention can be obtained from a study of the drawings, the disclosures, and the appended claims.

What is claimed is:

1. A method of mixing a coating asphalt mixture, the method comprising the steps of:
   adding a volume of asphalt to a first mixer from an asphalt supply that is in fluid communication with the first mixer, wherein the asphalt supply has a varying viscosity;
   adding a volume of aggregate filler to the first mixer using an aggregate filler supply that is in operable communication with the first mixer;
   mixing the volume of asphalt and the volume of asphalt filler in the first mixer to form a coating asphalt mixture;
   conveying the asphalt coating mixture through a coater supply line after mixing the volume of asphalt and the volume of asphalt filler;
   adding a volume of asphalt viscosity modifier to the coating asphalt mixture in the coating supply line downstream of the first mixer from an asphalt viscosity modifier supply that is in fluid communication with the coating supply line using an asphalt viscosity modifier pump, wherein the volume of asphalt viscosity modifier has a known viscosity;
   mixing the volume of asphalt viscosity modifier and the coating asphalt mixture in a second mixer, the second mixer being downstream of the first mixer;
   measuring a viscosity of the coating asphalt mixture using a viscosity gauge downstream of the second mixer and comparing the measured viscosity of the coating asphalt mixture to a desired viscosity of the coating asphalt mixture; and
   adjusting the operation of the asphalt viscosity modifier pump to adjust the volume of asphalt viscosity modifier supplied to the coating supply line based upon the measured viscosity of the coating asphalt mixture to substantially maintain the measured viscosity at the desired viscosity of the coating asphalt mixture using a control system in electronic communication with the asphalt viscosity modifier pump.

2. The method of mixing a coating asphalt mixture of claim 1 further comprising the step of conveying and directing the coating asphalt mixture to the first mixer using a supply return valve and a supply return line if the coating asphalt mixture is outside of a specification for the desired viscosity of the coating asphalt mixture.

3. The method of mixing a coating asphalt mixture of claim 1 further comprising the step of determining the volume of asphalt viscosity modifier to be added to the mixer to result in the desired coating viscosity using two or more level sensors.

4. The method of mixing a coating asphalt mixture of claim 1 wherein the asphalt viscosity modifier is a wax.

5. A method of mixing a coating asphalt mixture, the method comprising the steps of:

supplying a volume of an asphalt to a mixer from an asphalt supply, the asphalt having a first viscosity, and wherein the first viscosity is variable;

supplying a volume of aggregate filler to the mixer;

mixing a combined volume of a plurality of input materials into a coating asphalt mixture using the mixer, wherein the plurality of input materials comprises at least the volume of asphalt, and the volume of aggregate filler;

supplying a volume of asphalt viscosity modifier to the coating asphalt mixture from an asphalt viscosity modifier supply using an asphalt viscosity modifier pump to form a modified coating mixture, wherein the modified coating mixture has a second viscosity, wherein the second viscosity must meet a pre-determined specified viscosity range, and wherein the asphalt viscosity modifier has a known third viscosity, and wherein the volume of the asphalt viscosity modifier is supplied to a coating supply line carrying the coating asphalt mixture to a coater downstream of the mixer;

mixing the volume of the asphalt viscosity modifier into the coating asphalt mixture at a second mixer downstream of the mixer;

measuring the second viscosity of the modified coating mixture using a viscosity gauge after the supplying the volume of asphalt viscosity modifier to the coating asphalt mixture step;

adjusting the volume of the asphalt viscosity modifier supplied to the coating asphalt mixture based upon variations in the second viscosity due to variations of a material property of one or more of the input materials in the coating asphalt mixture to substantially maintain the second viscosity within the pre-determined specified viscosity range; and controlling the operation of the asphalt viscosity modifier pump using a control system in electronic communication with the asphalt viscosity modifier pump.

6. The method of claim 5 further comprising the step of adding asphalt viscosity modifier to the coating asphalt mixture if the measured second viscosity is higher than the specified viscosity range.

7. The method of claim 5 further comprising the step of reducing the amount of asphalt viscosity modifier added to the coating asphalt mixture if the measured second viscosity is lower than the specified viscosity range.

8. The method of claim 5 further comprising the step of mixing the coating asphalt mixture until the mixture is at least substantially homogeneous.

9. The method of claim 5 wherein the asphalt viscosity modifier is a wax.

10. The method of claim 5 wherein the asphalt viscosity modifier is one of the plurality of input materials supplied to the mixer.

* * * * *